(12) United States Patent
Nakayama et al.

(10) Patent No.: US 7,369,902 B2
(45) Date of Patent: May 6, 2008

(54) SLAVE UNITS AND NETWORK SYSTEM AS WELL AS SLAVE UNIT PROCESSING METHOD AND DEVICE INFORMATION COLLECTING METHOD

(75) Inventors: Teruyuki Nakayama, Kyoto (JP); Toshiyuki Nakamura, Kyoto (JP); Yasuo Muneta, Kyoto (JP)

(73) Assignee: Omron Corporation, Kyoto-Shi (JP)

( * ) Notice: Subject to any disclaimer, the term of this patent is extended or adjusted under 35 U.S.C. 154(b) by 0 days.

(21) Appl. No.: 10/478,520

(22) PCT Filed: May 31, 2002

(86) PCT No.: PCT/JP02/05388

§ 371 (c)(1), (2), (4) Date: Aug. 2, 2004

(87) PCT Pub. No.: WO02/097542

PCT Pub. Date: Dec. 5, 2002

(65) Prior Publication Data

US 2005/0017875 A1 Jan. 27, 2005

(30) Foreign Application Priority Data

May 31, 2001 (JP) .............................. 2001-164562

(51) Int. Cl.
*G05B 19/18* (2006.01)
*B64D 1/04* (2006.01)
*G06F 15/16* (2006.01)
*G06F 13/00* (2006.01)

(52) U.S. Cl. ........................... 700/3; 89/1.56; 356/459; 709/208; 709/209; 709/210; 709/211; 710/110

(58) Field of Classification Search .................... 700/3; 702/56, 182; 340/573.1; 399/12; 705/29; 89/1.56; 356/459; 709/208–211; 710/110
See application file for complete search history.

(56) References Cited

U.S. PATENT DOCUMENTS 3,803,974 A * 4/1974 Everest et al. ............... 89/1.56

(Continued)

FOREIGN PATENT DOCUMENTS

EP 0905594 A1 3/1999

(Continued)

OTHER PUBLICATIONS

Asthana et al.; US Statutory Invention Registration No. H001,882; Asthana et al.; Oct. 3, 2000.

*Primary Examiner*—Anthony Knight
*Assistant Examiner*—Sunray Chang
(74) *Attorney, Agent, or Firm*—Foley & Lardner LLP

(57) ABSTRACT

A network system is constructed by connecting a safety PLC constituting a master unit and safety slaves 2 to each other through a safety network 3. The safety slaves each have a device information storage unit 25 for storing individual information and status information of the safety devices connected. The individual information is acquired and stored in advance, while the stored contents of the status information are updated based on the result of monitoring the status of the safety devices in operation. These processes are executed by a MPU 23. In response to a request from the safety PLC, the device information stored are transmitted, so that the safety PLC can collect and manage the device state as well as the normal state of the slave units.

12 Claims, 8 Drawing Sheets

U.S. PATENT DOCUMENTS

| | | | |
|---|---|---|---|
| 4,625,308 A | 11/1986 | Kim et al. | |
| 4,715,031 A | 12/1987 | Crawford et al. | |
| 4,750,171 A | 6/1988 | Kedar et al. | |
| 5,059,953 A | 10/1991 | Parsons et al. | |
| 5,130,716 A | 7/1992 | Kleiber | |
| 5,157,780 A | 10/1992 | Stewart et al. | |
| 5,206,835 A | 4/1993 | Beauducel | |
| 5,218,680 A | 6/1993 | Farrell et al. | |
| 5,282,127 A | 1/1994 | Mii | |
| 5,363,194 A * | 11/1994 | Killpatrick et al. | 356/459 |
| 5,400,018 A | 3/1995 | Scholl et al. | |
| 5,519,607 A | 5/1996 | Tawil | |
| 5,572,195 A * | 11/1996 | Heller et al. | 340/825.49 |
| 5,732,094 A | 3/1998 | Petersen et al. | |
| 5,786,996 A | 7/1998 | Vitkus et al. | |
| 5,841,654 A | 11/1998 | Verissimo et al. | |
| 5,850,338 A | 12/1998 | Fujishima | |
| 5,907,689 A | 5/1999 | Tavallaei et al. | |
| 5,933,675 A | 8/1999 | Sawada et al. | |
| 5,995,916 A | 11/1999 | Nixon et al. | |
| 6,026,348 A * | 2/2000 | Hala | 702/56 |
| 6,154,726 A | 11/2000 | Rensimer et al. | |
| 6,347,252 B1 | 2/2002 | Behr et al. | |
| 6,353,615 B1 | 3/2002 | Bohne | |
| 6,353,867 B1 | 3/2002 | Qureshi et al. | |
| 6,389,480 B1 | 5/2002 | Kotzur et al. | |
| 6,473,811 B1 * | 10/2002 | Onsen | 710/15 |
| 6,477,335 B1 * | 11/2002 | Surya et al. | 399/12 |
| 6,507,804 B1 * | 1/2003 | Hala et al. | 702/182 |
| 6,532,508 B2 | 3/2003 | Heckel et al. | |
| 6,574,234 B1 | 6/2003 | Myer et al. | |
| 6,577,918 B1 | 6/2003 | Roth | |
| 6,640,268 B1 | 10/2003 | Kumar | |
| 6,708,072 B2 * | 3/2004 | Arima et al. | 700/108 |
| 6,762,684 B1 * | 7/2004 | Camhi | 340/573.1 |
| 6,832,343 B2 | 12/2004 | Rupp et al. | |
| 7,152,188 B1 | 12/2006 | Meyer-Graefe et al. | |
| 2001/0037267 A1 * | 11/2001 | Sato et al. | 705/29 |
| 2002/0082060 A1 | 6/2002 | Kang et al. | |
| 2002/0129033 A1 | 9/2002 | Hoxie et al. | |
| 2003/0009610 A1 | 1/2003 | Nolan et al. | |
| 2003/0037170 A1 | 2/2003 | Zeller et al. | |
| 2003/0114288 A1 | 6/2003 | Harding et al. | |
| 2003/0148760 A1 | 8/2003 | Takayanagi | |
| 2004/0018817 A1 | 1/2004 | Kanayama et al. | |
| 2004/0125821 A1 | 7/2004 | Kuhl | |
| 2004/0181296 A1 | 9/2004 | Muneta et al. | |
| 2004/0210323 A1 | 10/2004 | Muneta et al. | |
| 2004/0210326 A1 | 10/2004 | Muneta et al. | |
| 2004/0210329 A1 | 10/2004 | Chen et al. | |
| 2004/0210620 A1 | 10/2004 | Muneta et al. | |
| 2004/0215354 A1 | 10/2004 | Nakamura et al. | |
| 2005/0017875 A1 | 1/2005 | Nakayama et al. | |

FOREIGN PATENT DOCUMENTS

| | | |
|---|---|---|
| GB | 2267984 A | 12/1993 |
| GB | 2307068 A | 5/1997 |
| GB | 2 347 234 | 8/2000 |
| JP | 60-062482 | 4/1985 |
| JP | 03-116395 A | 5/1991 |
| JP | 04-045697 A | 2/1992 |
| JP | 05-37980 A | 2/1993 |
| JP | 6-324719 A | 10/1995 |
| JP | 7-282090 A | 10/1995 |
| JP | 08-211792 A | 8/1996 |
| JP | 11-24744 A | 1/1999 |
| JP | 2000-259215 A | 9/2000 |
| JP | 2000-269996 A | 9/2000 |
| JP | 2001-83002 A | 3/2001 |
| JP | 2001-084014 A | 3/2001 |
| JP | 2002-71519 A | 3/2002 |
| JP | 2002-73121 A | 3/2002 |
| WO | WO99/67690 | 12/1999 |
| WO | WO 00/68660 | 11/2000 |
| WO | WO 02/098065 A1 | 12/2002 |

* cited by examiner

Fig. 3

| | Device type | Maker | Model | Status | Number of times operated | Life setting | Turn-on time | Self-diagnosis information | Result of life | ... |
|---|---|---|---|---|---|---|---|---|---|---|
| Input 1 | Door SW | A company | XXXXX | ON | 151 | 80000 | 2877h | Normal | Normal | ... |
| Input 2 | | | | | | | | | | |
| Input 3 | Limit SW | B company | YYYYY | ON | 50 | 80000 | 2897h | Normal | Normal | ... |
| Input 4 | Emergency stop SW | A company | ZZZZZ | ON | 2 | 50000 | 2899h | Normal | Normal | ... |
| ... | | | | | | | | | | |

US 7,369,902 B2

SLAVE UNITS AND NETWORK SYSTEM AS WELL AS SLAVE UNIT PROCESSING METHOD AND DEVICE INFORMATION COLLECTING METHOD

This is a National Stage Application of International Application Number PCT/JP02/05388 filed May 31, 2002 (now published as WO 02/097542 on Dec. 5, 2002), which claims priority to Japanese Application Number 2001-164562 filed May 31, 2001, and is herein incorporated in its entirety by reference.

TECHNICAL FIELD

The present invention relates to slave units and a network system as well as a slave unit processing method and a device information collecting method.

BACKGROUND ART

In the programmable controller (hereinafter, referred to as "PLC") used for the factory automation (hereinafter, referred to as "FA"), the on/off information is input from an input device such as a switch or a sensor, and the logic operation is executed according to a sequence program (also referred to as the user program) written in the ladder language or the like. In accordance with the operation result obtained, the signal of on/off information is output to an output device such as a relay, a valve or an actuator thereby to perform the control operation.

The PLC is connected to the input device and the output device either directly or through a network. In the case where a network system connected by a network is constructed, the on/off information is transmitted or received through the particular network. In the process, the information is transmitted by the master-slave method in which the PLC normally acts a master unit and the device as a slave unit.

Recently, on the other hand, a fail-safe system has been introduced in the control operation with PLC. Specifically, the network as well as the PLC and each device are configured of a built-in safety function. The safety function is defined as a function to confirm safety and output data. The safety system is such that in the case where an emergency stop switch is depressed or a sensor such as a light curtain detects the intrusion of a person (a part of the human body) and the network system faces a dangerous situation, the fail-safe function works and the system turns to the safety side, thereby stopping the operation. In other words, the safety function described above allows a signal to be output only in the case where safety is secured in storage and to start the operation of a machine. In the case where no safety is assured, therefore, the machine stops.

The state of a given slave unit can be returned as a response by the slave unit that has received the request from PLC (master unit). As a result, PLC can acquire the status of the slave units connected to a network.

In the conventional network system, though the informed on the slave units connected can be recognized, the information on the input device or the output device connected to a slave unit cannot be recognized from PLC (master unit). The slave unit can be informed of the fact that a malfunction or a fault has occurred. In case of a malfunction, therefore, it is necessary to resort to the site of installation and specify the cause of the malfunction. In the case where a given part is required to be changed, an order for the part is issued and, with the newly acquired part, the installation site is visited again to change the part. This maintenance is complicated, and makes it difficult to take the necessary action quickly. It is still more difficult to monitor the life of the input and output devices connected to a slave unit from PLC, and therefore, a malfunction or fault is often handled only after it has actually occurred.

Even in the case where the installation site of a slave unit or a device connected with the slave unit is visited upon occurrence of a fault or the like, therefore, the status cannot be easily checked if the device is small or installed in the depth or behind other devices. As a result, the status of these input and output devices cannot be accurately grasped, and therefore the cause of a malfunction or fault may not be analyzed sufficiently.

Further, in the case of a network system having security means, the safety devices, though high in reliability and redundancy, are often shorter in life than the devices making up the conventional normal network. Once a malfunction of these safety devices occurs, it leads to the stoppage of the whole system, and therefore has a great disadvantageous effect on the whole system. Consequently, the function of monitoring the devices connected to a slave unit is more crucial than in the conventional system.

An object of this invention is to provide a slave unit and a network system as well as a slave unit processing method and a device information collecting method, in which the information on each device connected to a slave unit can be collected through a network.

DISCLOSURE OF THE INVENTION

In order to achieve the aforementioned object, according to this invention, there is provided a slave unit connectable to a network, comprising information collecting means for collecting the information on the devices connected, device information storage means for storing the device information collected by the information collecting means, and means for outputting the information stored in the device information storage means through the network. The information collecting means corresponds to a MPU 23 in the embodiments.

Preferably, the device information include at least one of the individual information for specifying the devices and the status information for indicating the device status. The individual information is the one for specifying the model, the maker name, the type, the specification, etc. of a particular device. These device information are registered in the slave unit in advance and output as required. The status information, on the other hand, is the one for specifying the device status including the on/off state, the life information such as the turn-on time and the number of times operated and the result of self-diagnosis. This information can be acquired by monitoring the devices while the system is in operation. In other words, the device information collecting means has the function of monitoring the device status in real time and the function of acquiring the individual information prior to the start of the operation.

The network system according to this invention is constructed of a controller and the slave units described above connected to each other through the network. The device information output from the slave units are transmitted to the controller.

According to this invention, the information on the devices connected to the slave units are stored and held in each slave unit, and the particular information stored and held can be transmitted to other devices (such as a controller and a tool) through the network. Without visiting the site where each slave unit and the devices connected thereto are installed, therefore, the device information can be acquired. Once a malfunction is found in a given contact of a slave unit, the name of the device having the malfunction can be determined based on the information of the devices connected to the particular contact. Therefore, the maintenance job can be quickly carried out by preparing a normal device of the same type as the defective device and bringing it to the installation site. The status information can clarify the cause of an abnormal halt, while the notification of the service life information can prevent a malfunction which otherwise might occur upon expiry of the device life.

Further, the slave processing method according to this invention is the method of processing each slave unit connected to a network, wherein the collecting process for collecting the information on the devices connected to the particular slave, the process for storing in the device information storage means the device information obtained by executing the collecting process and the process of outputting the information stored in the device information storage means through the network are executed.

Also, the device information collecting method according to this invention is employed for a network system constructed by connecting a controller and slave units to each other through a network, wherein the slave unit executes the collecting process for collecting the information on the devices connected to each slave unit, the process for storing in the device information storage means the device information obtained by executing the collecting process and the process of outputting the information stored in the device information storage means through the network. The controller acquires and stores the device information output from the slave unit.

As another solving means, there is provided a device information collecting method for a network system constructed by connecting a controller and slave units to each other through a network. This network system is connected with a monitoring device, and the controller and the slave units are controlled by transmitting and receiving the control information such as the I/O information. Each slave unit executes the collecting process for collecting the information on the devices connected to the particular slave unit, the process for storing the device information obtained by executing the collecting process in the device information storage means and the process of outputting the information stored in the device information storage means through the network. The monitoring device acquires and stores the device information output from the slave unit.

The monitoring device is connected to the controller, and can indirectly acquire the device information through the controller. The device information can also be collected directly by connecting the monitoring device to the network to monitor the frames transmitted on the network and causing the monitoring device to receive the device information sent toward other nodes such as the controller. The monitoring device, if connected to the network, can of course acquire the device information directly by causing a slave unit to transmit the particular device information to the monitoring device. According to the embodiments, the monitoring device corresponds to a monitoring tool 5, a configuration. tool 31, a monitoring device 33, etc.

BRIEF DESCRIPTION OF THE DRAWINGS

FIG. 3 is a diagram showing the data structure of a device information storage unit.

BEST MODE FOR CARRYING OUT THE INVENTION

This invention will be described in more detail with reference to the accompanying drawings.

Figure 1:
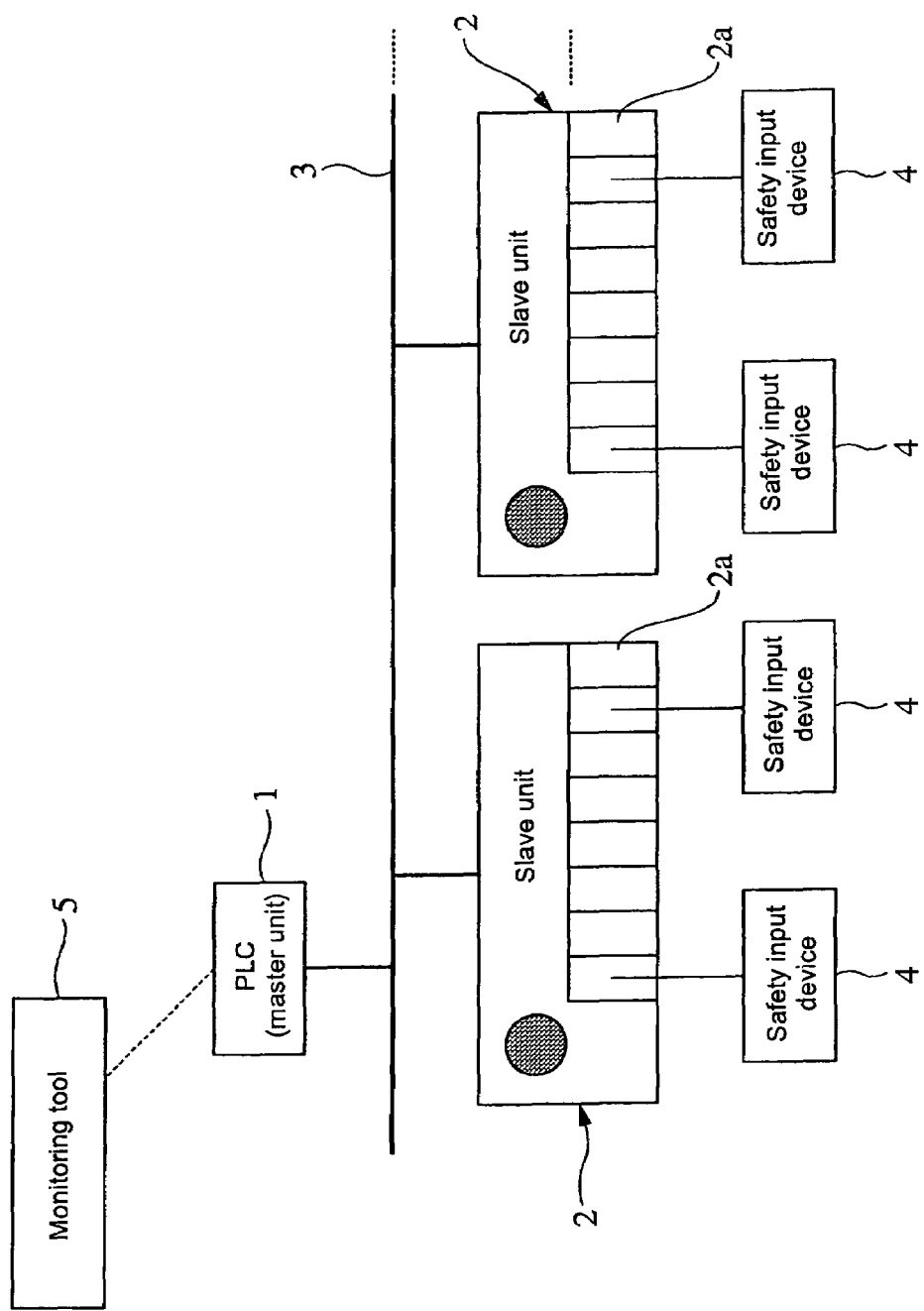
FIG. 1 is a diagram showing a network system according to an embodiment of this invention.

FIG. 1 shows an example of a safety network system to which the invention is applicable. As shown in the figure, a safety PLC 1 (master unit) and a plurality of safety slave units 2 are connected to each other through a safety network 3. The safety PLC 1 and the safety slave units 2 transmit and receive. information to and from each other by the master-slave method. Further, each safety slave unit 2 is connected with various safety devices 4 such as input devices and output devices in addition to a safety door switch, a safety limit switch and an emergency stop switch. It is noted that the safety PLC 1 is configured by connecting a plurality of units including, for example, a CPU unit, a master unit (communication unit) and an I/O unit. In this case, the master unit is connected to the safety network 3.

Further, a monitoring tool (such as a personal computer) 5 is connectable to the CPU unit and the master unit of the safety PLC 1. This monitoring tool 5 collects and manages the information on the safety slave units 2 and the safety devices 4 connected thereto, through the safety PLC 1 as described later.

The various devices making up this safety network system all have a built-in safety (fail-safe) function. This safety function is conventionally well known and therefore is not described in detail, but only the transmission and reception of information which constitute the main parts of the invention.

Figure 2:
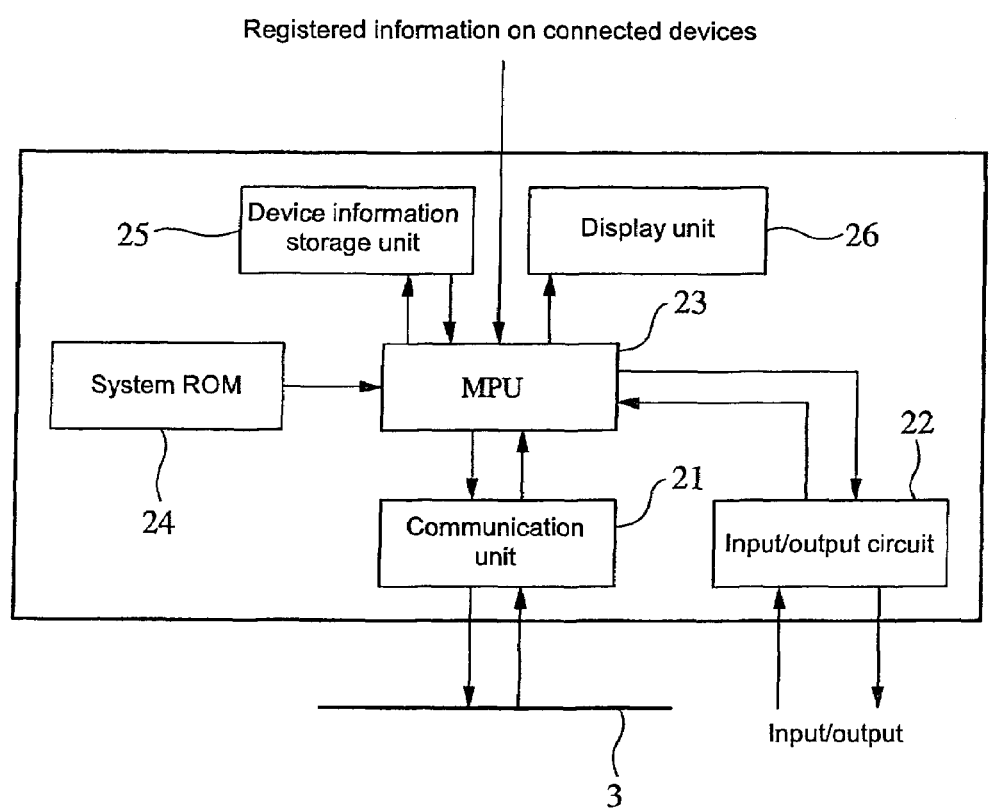
FIG. 2 is a diagram showing a slave unit according to an embodiment of the invention.

The safety slave units 2 each have a plurality of terminal bases 2a which are connected with various safety devices 4. The safety slave unit 2 has the internal structure as shown in FIG. 2. As shown in the same figure, the safety slave unit 2 includes a communication unit 21 connected to the safety network 3 for transmitting and receiving data to and from the safety PLC 1 (master unit), an input/output circuit 22 for transmitting and receiving data to and from the safety devices 4 connected to the safety slave unit 2, and a MPU 23 for executing a predetermined process by reading the program stored in a system ROM 24. The MPU 23, in compliance with the request addressed to itself through the communication unit 21, executes the process of returning the information (safety information, etc.) acquired from the safety devices 4 through the input/output circuit 22 to the safety PLC 1 (master unit) through the communication unit 21 and the safety network 3.

Further, the MPU 23 has the self-diagnosis function and the function of monitoring the operating conditions (the turn-on time, the number of times turned on/off, etc.) of the safety devices 4, and also executes the process of storing the device information such as the diagnosis result and the operating conditions obtained by the operation of each function in a device information storage unit 25. The unsafety information (device information) stored in this device information storage unit 25 are also returned in compliance with the request of the PLC 1 thereby to transmit the device information to the safety PLC 1. It is noted that this device information storage unit 25 can be configured of, for example, an EEPROM.

Furthermore, the information stored in the device information storage unit 25 is not limited to the operating conditions, etc. of the safety devices 4 described above but also include individual information such as the type, model name and the maker name of the safety devices 4 connected.

The device information storage unit 25 has a data structure as shown, for example, in FIG. 3. Inputs 1, 2, 3, . . . designate the numbers of contacts (terminal bases 2a). Of the shown items to be registered, the type, the maker name, the model and the life setting are registered in advance. Specifically, using a tool connected to the safety PLC 1 or the safety network 3, for example, the required information is sent to the safety slave units 2 through the safety network 3, or from the tool directly connected to the safety slave unit 2. The MPU 23 of the safety slave unit 2 thus acquires the same information through the communication unit 21, and registers the particular information as related to the contact number in the device information storage unit 25. The life setting includes, for example, the turn-on time, the number of times operated or a value obtained by a predetermined formula from the turn-on time or the number of times operated.

The state, the number of times operated, the turn-on time, the self-diagnosis information and the notice flag are collected and recorded by the MPU 23 while the actual system is in operation. The state is the information for discriminating whether the safety devices 4 are operating (in on state) or not (off information), the number of times operated is the information indicating the number of times the contacts of the safety devices 4 are turned on/off, and the turn-on time is the accumulated time when the safety devices 4 are turned on. Further, the self-diagnosis information is the result of diagnosis obtained by carrying out the self-diagnosis function of the safety slave units 2 and diagnosing the safety devices connected, or in the case where a given safety device 4 has the self-diagnosis function, the result of diagnosis sent from the particular safety device 4. Further, the result of life stored is indicative of whether the life has expired or not (normal). The expiry of life indicates either a case where life has actually expired or a case where the expiry of life is near. Furthermore, the safety slave unit 2 has a display unit 26 which can display the device information stored in the device information storage unit 25.

The specific functions of the MPU 23 for executing the process described above are shown in the flowcharts of FIGS. 4 and 5. Specifically, the first step is the initial registration (ST1). In this initial registration, the individual information on the safety devices supplied from the tool are acquired and registered in the device information storage unit 25 as related to the contact number.

Once the actual control operation is started, the normal safety function process (ST2), the unsafety information confirmation/collecting process (ST3) and the information updating process (ST4) are executed. It is then determined whether there is a request from a higher level of the network, that is, whether there is a request from the safety PLC 1 (ST5). Specifically, as well known, the master-slave method being involved, the safety PLC 1 which is a master unit sequentially issues a request to the safety slave units 2 connected to the safety network 3 in one communication cycle, and receives the response from the safety slave units to which the request is issued, thereby transmitting and receiving the data. In the case where there is a request addressed to the very MPU 23 (Yes in step 5), therefore, the information meeting the request is transmitted to the safety PLC (ST6). After this transmission, or in the absence of a request to the MPU 23 itself, the process is returned to step 2. After that, the aforementioned process is repeatedly executed.

Figure 5:
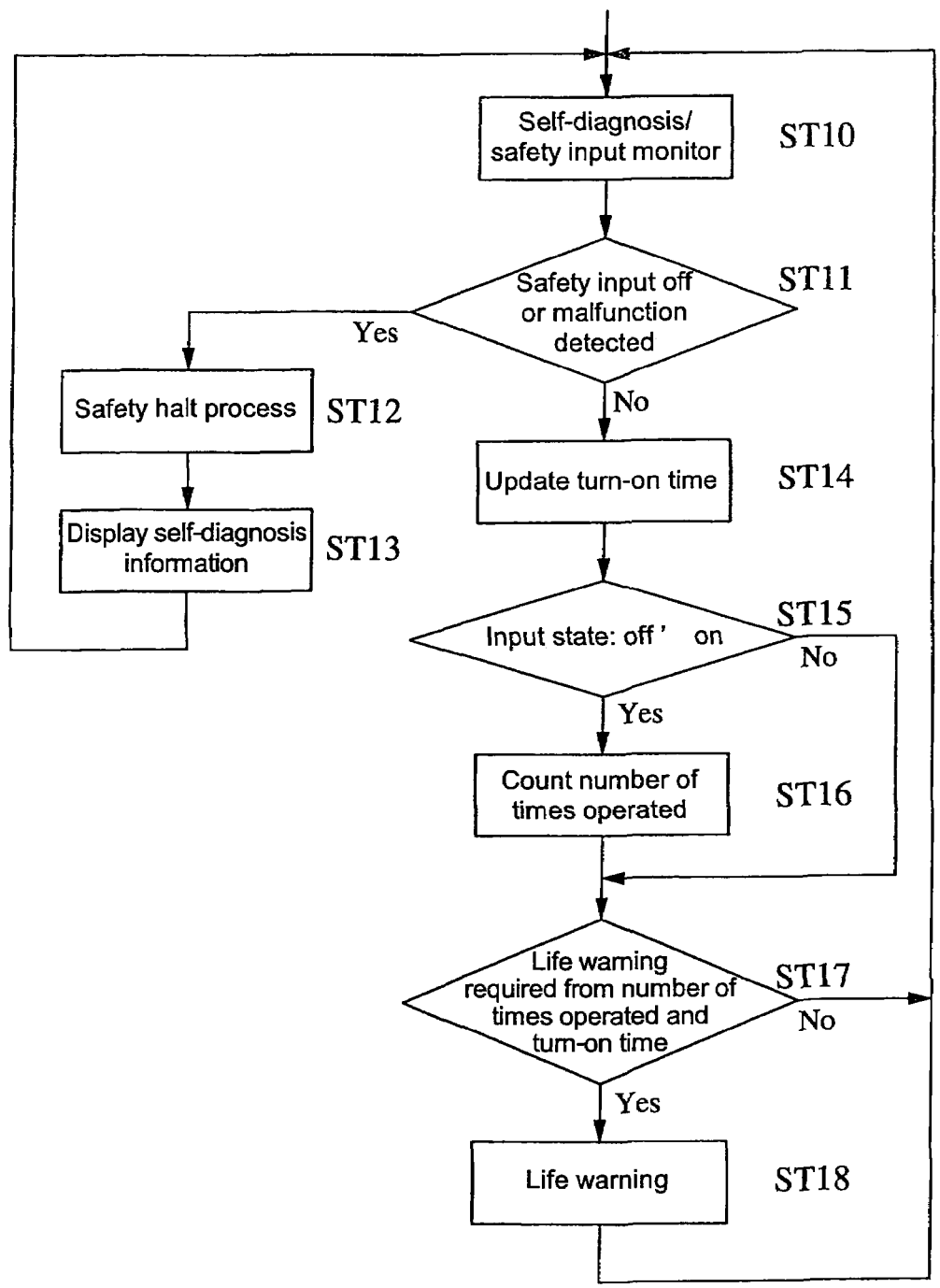
FIG. 5 is a flowchart showing the functions of a MPU.

A more specific sequence of the safety function process (ST2), the unsafety information confirmation/collecting process (ST3) and the information updating process (ST4) is shown in FIG. 5. As shown in the same figure, the MPU 23 makes self-diagnosis and monitors the safety input (ST10). Specifically, the self-diagnosis is the inspection conducted to see whether a malfunction has occurred in the safety devices 4 connected, and is a well-known process. The monitoring of a safety input, on the other hand, is to monitor the input from the safety devices 4 connected. In the case of a malfunction or an input, a particular safety device 4 with which the information is associated is also specified.

Then, it is determined whether as the result of self-diagnosis or the safety input monitoring in step 10, a malfunction is detected or the safety input is off (not safe or dangerous) (ST11). In the case where a malfunction or the like is detected, the safety halt process is executed (ST12). In other words, the fail-safe function works to halt the operation. Also, the particular malfunctional state is stored in the column of the self-diagnosis result or the on/off information of the corresponding contact number in the device information storage unit 25. The diagnosis result, etc. correspond to the request for the safety information from the safety PLC 1 and are transmitted as a safety response. The self-diagnosis information (the safety device that has developed a malfunction and the contents of the malfunction) are output to and displayed on the display unit 26. The process of step 10 to step 13 represents the safety function process for step 2.

In the case where the branching decision in step 11 is "No", that is, the safe state prevails, the turn-on time is updated (ST14). Specifically, the time from the preceding update process to the present time, for example, is measured by the timer (temporarily stopped without counting during a halt (not turned on) of the safety device 4), and the sum of the turn-on time for the preceding update process and the turn-on time from the update process to the present time is set as a new turn-on time, and this new turn-on time is stored in the device information storage unit 25.

It is determined whether the input state of a safety device 4 has turned on (present session) from off state (preceding session) (ST15). Specifically, in the case where the input state of the safety device 4 is off in the preceding session, the data in the on/off information column of the device information storage unit 25 is turned off through the process of step 12. Therefore, in the case where the on/off information of the corresponding contact number is off, the branching decision is "Yes". Then, the process proceeds to step 16, and the operation count is incremented by one (ST16). This operation count is registered in the "number of times operated" column of the device information storage unit 25, while at the same time turning on the "state" column of the device information storage unit 25. As a result, when the operation count is incremented by one, so that the "state"

column turns on. In the case where the branching decision of step 15 is executed in the next cycle (the safety input cannot be turned off midway), therefore, "No" is the answer and the operation count is not carried out. Also, since the ON state is registered in advance, there is no need of writing "ON" again.

After the above-mentioned operation count or in the absence of input state change (No in step 15), the process proceeds to step 17 to determine whether the number of times operated or the turn-on time has reached a value requiring a life warning or not. The value requiring a life warning (threshold value) is set for each safety device in the "life setting" column of the device information storage unit 25. Such a value is compared with the current number of times operated and the turn-on time, and it is determined whether the life setting has reached the value requiring a life warning or not.

In the case where the value requiring a life warning is not yet reached, the process returns to step 10. In the case where it is determined that a life tendency is required, on the other hand, the process proceeds to step 18, and the "result of life" column of the device information storage unit 25 for the safety device whose life has expired of the device information storage unit 25 is updated from "normal" to "abnormal". This result is also sent in compliance with the request from the safety PLC. The processes of step 14 to step 18 described above constitute the unsafety information conforming/collecting process (ST3) and the information updating process (ST4).

Figure 4:
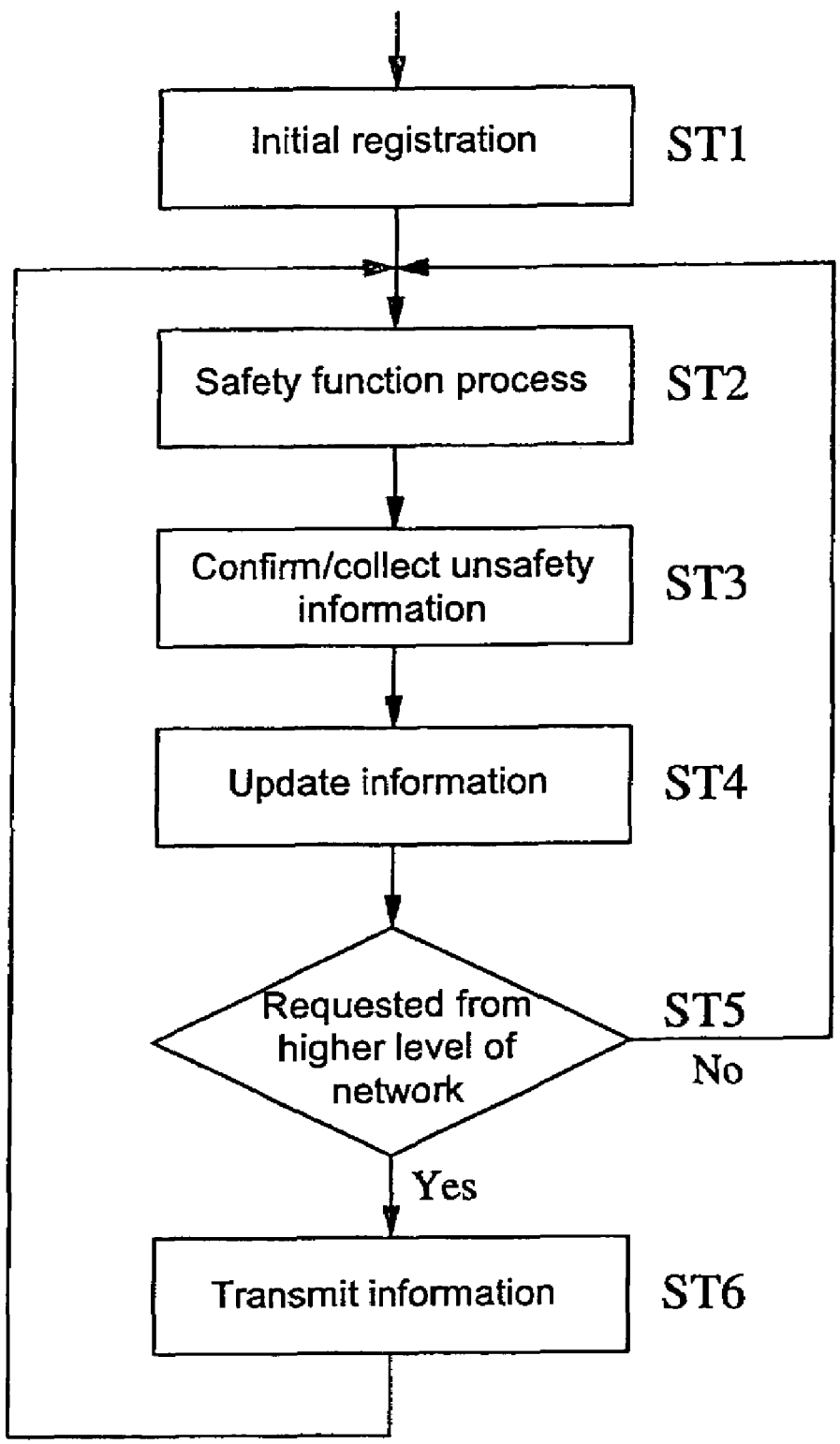
FIG. 4 is a flowchart showing the functions of a MPU.
Figure 6:
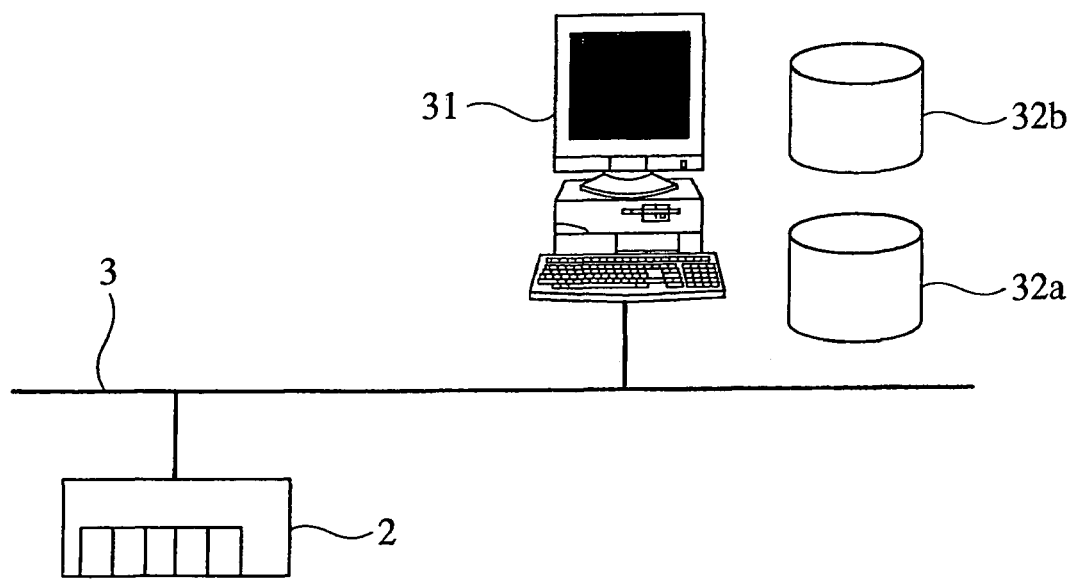
FIG. 6 is a diagram showing an example of a system configuration for initial registration in a slave unit.

Further, a more specific sequence of the initial registration process in step 1 of FIG. 4 is as described below. Specifically, as shown in FIG. 6, the initial registration is made in the slave units 2 using the configuration tool 31 connected through the safety network 3. In other words, the configuration tool 31 has a device data base 32*a* and a device-related information data base 32*b*. These data bases 32*a* and 32*b* may be configured as a physically single memory or as separate memories. These data bases can of course be configured of either the internal and external storage units of the configuration tool 31 or independent storage units installed on the safety network 3.

The device data base 32*a* has stored therein the information for defining the safety slave units 2 and other network devices and the input/output devices connected to the network, and all the information supported by each of these devices. The items of these information include the device name, the vendor name, the model name, the settable individual parameter, the connectable input/output device information and the life information.

Figure 7:
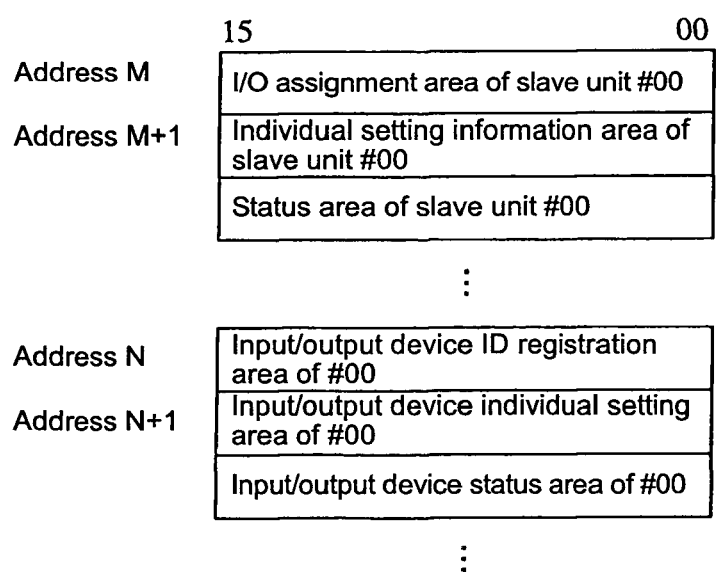
FIG. 7 is a diagram showing an example of the internal data structure of a data base.

The device-related information data base 32*b*, on the other hand, has stored therein the information for relating the network devices such as the slave units to the input/output devices connected thereto and the setting information. The items of these information include the I/O assignment information and the individual setting information. The data structure of these information is such that, as shown in FIG. 7, the information on the slave units (node #00) providing the network devices and the information on the input/output devices connected to the slave units (node #00) are sequentially stored.

Figure 8:
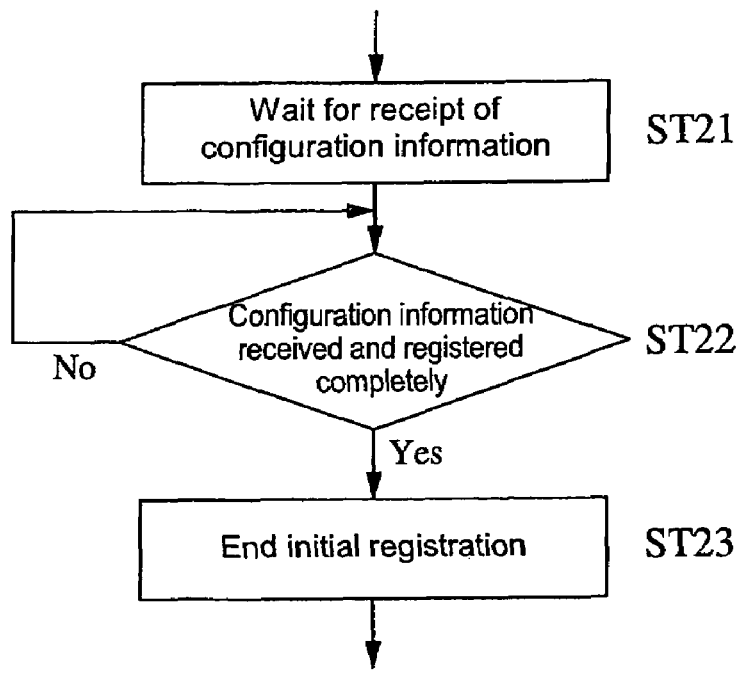
FIG. 8 is a flowchart showing a specific processing function for the initial registration process.
Figure 9:
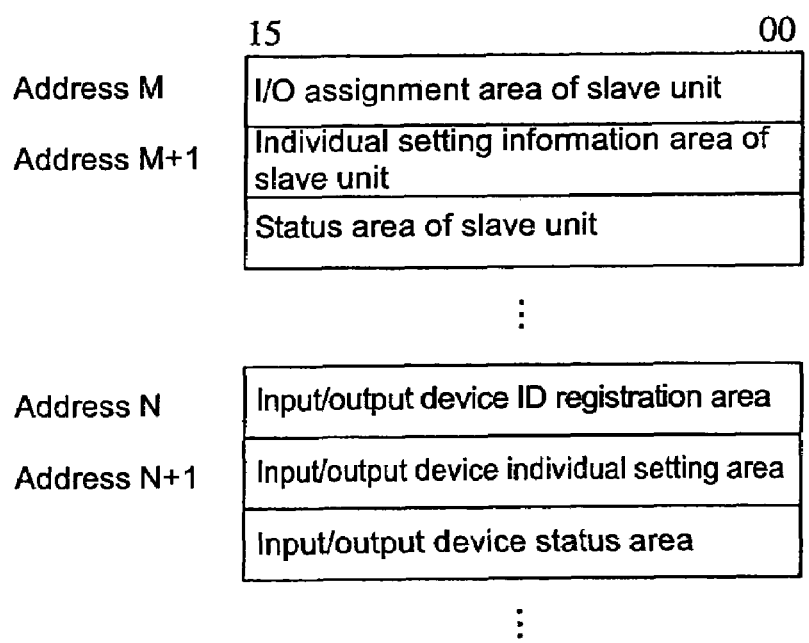
FIG. 9 is a diagram showing an example of the data structure stored in a device information storage unit 25.

The user, when making initial registration in the safety slave units connected to the safety network 3 using the configuration tool 6, collects the information on the slave units to be registered, from the data bases 32*a* and 32*b* and transmits the collected information to the corresponding safety slave units through the safety network 3 as configuration information. Then, each safety slave unit 2, as shown in the flowchart of FIG. 8, waits for the reception of the configuration information (ST21). Upon reception of the configuration information, each safety slave unit 2 registers the received configuration information in the device information storage unit 25 thereof (ST22). The completion of this registration terminates the various registrations (ST23). As the result of completion of this registration, the device information storage unit 25 is held with the data structure as shown in FIG. 9, for example. Specifically, the information on the slave unit itself (registered in M and subsequent addresses) and the information on the input/output devices connected thereto (registered in N and subsequent addresses) are held. The process of steps 21 to 23 corresponds to the initial registration process of step 1 shown in FIG. 4.

The other desirable information for each I/O terminal of the salve units than those on the slave units registered in this initial registration process and those on the input/output devices connected to the particular slave units, shown in FIG. 3, include the following various ones. First, for example, the information by type includes the information indicating the terminal ID. This includes the terminal No., the terminal attributes (input, output, AC, DC, semiconductor, contact, etc.), the screw size, the signal name, etc. Also, the information indicating the ID of the devices connected to each I/O terminal is also included. Specific ones are the device name, the maker name, the model, the serial No., the address and the sub-address. Further, the information registered as comments include, for example, the diameter of the wiring cable, the color of the wiring cable, the device control area, the device to be controlled, the magnitude of the possible danger of the device to be controlled. Also, the information set as the operating conditions include, for example, the threshold value (turn-on time, number of times turned on/off, leakage current, light amount, etc.). Further, the numerical information that can be counted include the number of times a device is turned on/off, the turn-on time of the device, the frequency at which the device is used. Also, the numerical information subjected to secular variation include, for example, the leakage current of a device, the light amount of the device, the response time of a machine, and the restoration voltage of the device. The present status information include "on or off", the analog value, the result of self-diagnosis (short-circuiting, disconnection, malfunction, etc.).

According to this embodiment, the safety PLC 1 gives a request for unsafety information (device information 4), and thus can collect the device information stored in the device information storage unit 25 of the safety slave unit 2. Thus, the collected information can be output to and displayed on the monitoring tool 5. Even at a remote place, therefore, the individual information (model, specification) and the conditions of the safety devices connected can be monitored and the cause of the malfunction can be clarified. Specifically, a defective safety device can be determined without visiting the installation site of the device. By visiting the installation site with a spare part for replacing the defective part, therefore, the restoration process such as the change of the safety device that has developed the malfunction can be quickly executed. Also, the notification of the life information can prevent the malfunction related to the device life.

Furthermore, the notification of the network information (the number of retrials made in case of a communication error, input/output response time, etc.) can clarify the points for improving the network environment and optimize the response time (safe down time for a safety protection system). Specifically, a safety device that frequently develops a malfunction or a fault is considered to harbor some problem, and in such a case, the particular device or the whole system can be changed.

Also, especially in the safety slave units, by making the most of the self-diagnosis function that has not been used conventionally as monitoring information, the causes of a device halt can be desirably grasped and notified by being classified into a halt by the safety input off operation, a halt due to a malfunction of the input/output circuit and a halt due to a malfunction of the communication between a master unit and a slave unit.

In the above-mentioned embodiments, an example of application as a safety network system is described. Nevertheless, the invention is of course applicable also to an ordinary network system lacking such safety functions.

Also, either one or a plurality of devices may be connected to one slave unit. The effects of this invention are exhibited more conspicuously, however, in the case where a plurality of devices are connected and the information on the devices connected to each contact can be discriminately known as in the embodiments described above. Specifically, even in the case where it can be detected whether a slave unit has developed a malfunction or not and which contact of the slave unit has developed a malfunction, it has thus far been impossible to determine which device is in what state without confirmation at the installation site as long as the device information is lacking. In this invention, however, the state of each of a plurality of devices, if any, can be acquired through a network.

Figure 10:
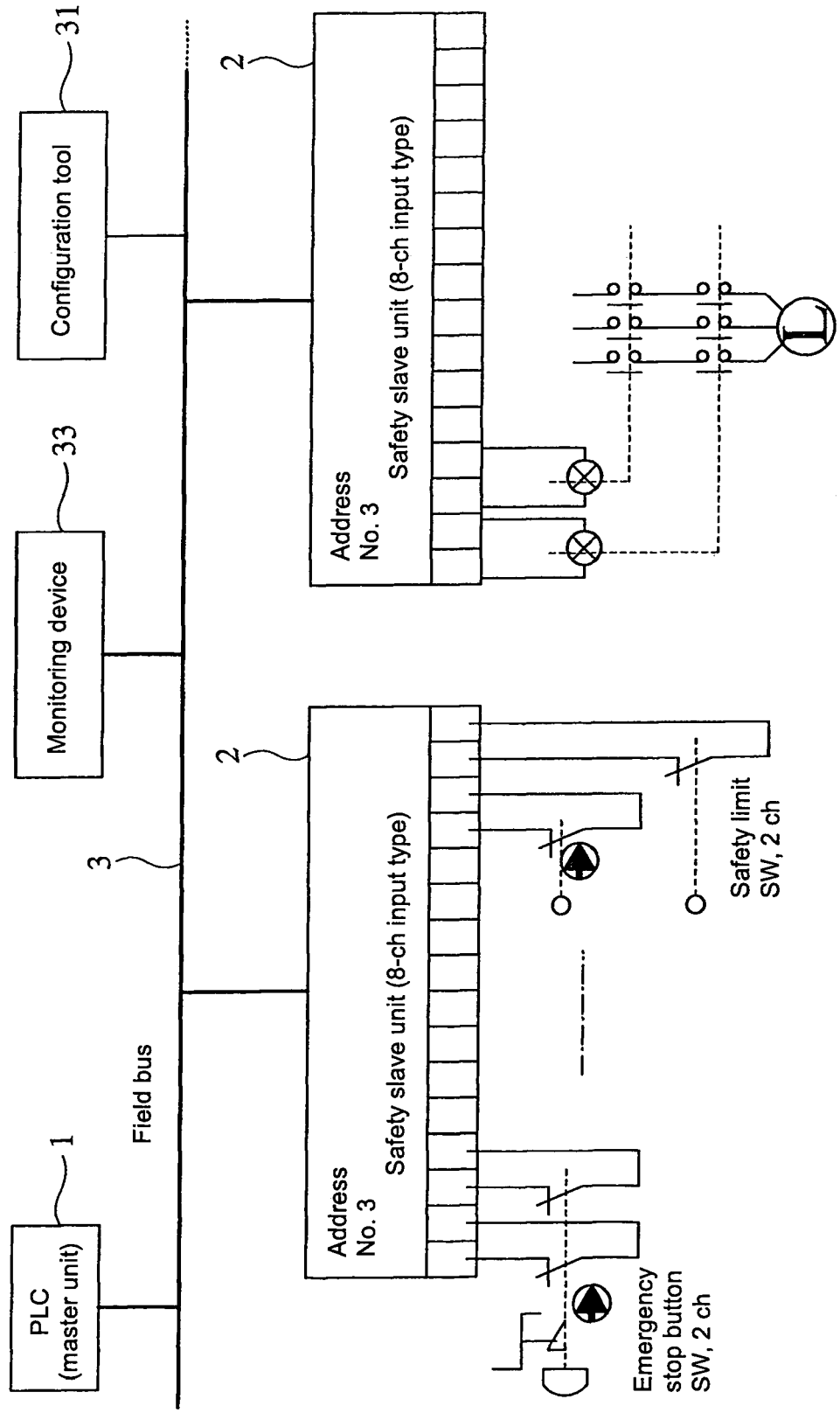
FIG. 10 is a diagram showing a network system according to another embodiment of the invention.

Further, the foregoing description concerns the master-slave method in which the slave units described in the embodiments above are shown, as an example, to transmit and receive the I/O information to and from the master unit, and the system is controlled by transmitting and receiving the I/O information to and from the controller (PLC) through the master unit. In this method, the master unit and the slave units are so related to each other that the desired slave unit gives a response to the request of the master unit. The slave units referred to in this invention, however, are not limited to those for communication between the master unit and the slave units. In other words, although the term "slave unit" is used, an arbitrary communication method can be employed. In this respect, strictly speaking, the slave unit according to the invention is considered to contain a different concept from the entity generally defined as a slave. Specifically, what is called the slave unit in this invention can use any communication protocol for actual transmission and receiving operation as long as it has the function of transmitting and receiving the I/O information required for control operation to and from the controller. Especially, the destinations of information to be transmitted in this invention other than the I/O information are not limited to the master unit or the controller, but as shown in FIG. 10, include a configurator (configuration tool) 31, a monitoring device 33 and other slave units and various nodes connected to the network. The communication method can also be appropriately selected in accordance with the other party of transmission. Also, the trigger for transmission is of course not limited to the one executed in response to an external request (external trigger), but transmission may be based on the internal trigger (internal timer or an event generated when predetermined conditions are met).

The "internal trigger" is based on the result of executing a predetermined process by a slave unit itself and generated within the slave unit. An example of the internal trigger is described below. Specifically, in the case where it is determined that the status information of the input/output devices acquired by a slave unit has reached a threshold value or whether it has exceeded a threshold value or not, the result of determination is generated. This result of determination is used as a trigger signal in some cases. Also, in the case where the initialization process is executed by switching on power for a slave unit, the process of outputting the information stored in a nonvolatile memory to a line or the process of generating a trigger may be included in the initialization process. Further, in some cases, a clock is held in a slave unit, and by use of this clock, a trigger signal is generated upon the lapse of each predetermined time or periodically or at a predetermined time point. In other cases, based on the state of the communication traffic with the master, a trigger signal is generated in the case where the communication process has a margin or a fault such as an abnormal voltage.

The "external trigger", on the other hand, is based on the command received by a slave unit through a network, and generated outside the slave unit. An information request command from the master unit to the slave unit, an information request command from the monitoring unit to the slave unit, the information request command from the configurator, and a command transmitted by a tool and sent through the PLC or the master unit, are some examples of the external trigger.

INDUSTRIAL APPLICABILITY

According to this invention, the following effects can be exhibited. Specifically, as described above, in this invention, the device information storage means is arranged in a slave unit to store and hold the information on the devices connected to the slave unit. Therefore, the information on each device connected to the slave unit which are so stored and held can be collected by the controller or the tool through the network.

The invention claimed is:

1. A slave unit connectable to a network, comprising:
information collecting means for collecting information on devices connected to the slave unit;
device information storage means for storing the information on said devices collected by said information collecting means; and
means for transmitting the information stored in said device information storage means through the network to a controller connected to the network, wherein the information includes individual information for specifying the devices and status information indicating the status of the devices.

2. The slave unit according to claim 1, wherein the information includes individual information for specifying the devices, the individual information for specifying the devices including at least one of model, maker name, type, or specification, corresponding to the device, wherein the information includes status information indicating the status of the devices, the status information including at least one of life setting, on/off state, turn-on times, number of times operated, or self-diagnosis results by the devices, corresponding to the device.

3. The slave unit of claim 2,
wherein the information transmitted includes either the individual information or the status information.

4. A method of processing a slave unit connected to a network to execute:
a collecting process for collecting information on devices connected to the particular slave unit;

a process of storing in a device information storage means of said slave unit said information obtained by executing said collecting process; and a process of transmitting through said network the information stored in said device information storage means to a controller connected to the network, wherein the information includes individual information for specifying the devices and status information indicating the status of the devices.

5. The method of claim 4,
wherein the individual information includes at least one of model, maker name, type and specification corresponding to the device, and wherein the status information includes at least one of life setting, on/off status, turn-on times, number of times operated and self-diagnosis results by the devices corresponding to the device.

6. The method of claim 5,
wherein the information transmitted includes either the individual information or the status information.

7. A device information collecting method for a network system constructed by connecting a controller and a slave unit through a network, wherein said slave unit executes:
a collecting process for collecting information on devices connected to the slave unit;
a process of storing in the device information storage means said device information obtained by executing said collecting process; and
a process of transmitting through said network to the controller connected to the network the information stored in said device information storage means, and
wherein said controller acquires and stores said information output from said slave unit, wherein the information includes individual information for specifying the devices and status information indicating the status of the devices.

8. The device information collecting method of claim 7,
wherein the individual information includes at least one of model, maker name, type and specification corresponding to the device, and wherein the status information includes at least one of life setting, on/off status, turn-on times, number of times operated and self-diagnosis results by the devices corresponding to the device.

9. The device information collecting method of claim 8,
wherein, the information transmitted includes either the individual information or the status information.

10. A device information collecting method for a network system constructed by connecting a controller and a slave unit through a network, wherein said network system is connected with a monitoring device, said controller and said slave unit perform a control operation by transmitting and receiving control information,
wherein said slave unit executes:
a collecting process for collecting information on the devices connected to the slave unit;
a process of storing in a device information storage means of the slave unit said information obtained by executing said collecting process, and
a process of transmitting, through said network to the monitoring device connected to the network, the information stored in said device information storage means; and
wherein said monitoring device acquires and stores said device information output from said slave unit, wherein the information includes individual information for specifying the devices and status information indicating the status of the devices.

11. The device information collecting method of claim 10,
wherein the individual information includes at least one of model, maker name, type and specification corresponding to the device, and wherein the status information includes at least one of life setting, on/off status, turn-on times, number of times operated and self-diagnosis results by the device corresponding to the device.

12. The device information collecting method 11,
wherein the information transmitted includes either the individual information or the status information.

* * * * *